United States Patent [19] [11] 4,207,246
Hafner et al. [45] Jun. 10, 1980

[54] ORGANOSILOXANES WITH SIC-BONDED GROUPS AND A PROCESS FOR PREPARING THE SAME

[75] Inventors: Walter Hafner, Furth; Erich Markl, Munich; Ludwig Eibel, Munich; Gerhard Kreis, Munich; Dietrich Samrowski, Munich; Manfred Wick, Schliersee; Bernward Deubzer, Burghausen; Wilhelm Friedrich, Munich, all of Fed. Rep. of Germany

[73] Assignee: Consortium für Elektrochemische Industrie GmbH, Munich, Fed. Rep. of Germany

[21] Appl. No.: 15,551

[22] Filed: Feb. 26, 1979

[30] Foreign Application Priority Data

Aug. 3, 1978 [DE] Fed. Rep. of Germany ....... 2809874

[51] Int. Cl.$^2$ .................................................. C07F 7/08
[52] U.S. Cl. .................................... 556/439; 252/78.3
[58] Field of Search .................................. 260/448.2 B

[56] References Cited
U.S. PATENT DOCUMENTS

| | | | |
|---|---|---|---|
| 2,723,987 | 11/1955 | Speier | 260/448.2 B |
| 2,770,632 | 11/1956 | Merker | 260/448.2 B |
| 2,805,237 | 9/1957 | Kiffer et al. | 260/448.2 B |

*Primary Examiner*—Paul F. Shaver

[57] ABSTRACT

This invention relates to organosiloxanes which have SiC-bonded ester groups and contain at least one unit of the general formula:

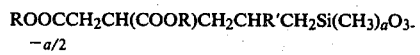

in which R represents the same or different monovalent hydrocarbon radicals having from 1 to 12 carbon atoms, which are free of aliphatic unsaturation and which may contain one ether oxygen atom; R' represents hydrogen or a methyl group ($CH_3$) and a is 0, 1 or 2. These organosiloxanes can be prepared by hydrolyzing or cohydrolyzing silanes of the general formula:

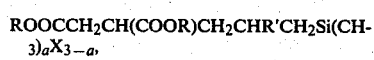

where R, R' and a are the same as above and X represents the same or different hydrolyzable atoms or groups. Also, they may be prepared by the addition of a diester of allyl succinic acid and/or methallyl succinic acid to an organosiloxane containing Si-bonded hydrogen. These new organosiloxanes may be used as lubricants for inorganic and organic fibers, metal surfaces and as hydraulic fluids.

7 Claims, No Drawings

ORGANOSILOXANES WITH SIC-BONDED GROUPS AND A PROCESS FOR PREPARING THE SAME

The present invention relates to organopolysiloxanes, and more particularly to organopolysiloxanes containing SiC-bonded ester groups and to a process for preparing the same.

BACKGROUND OF THE INVENTION

Organopolysiloxanes containing ester groups are known in the art. For example organopolysiloxanes having SiC-bonded ester groups, processes for their preparation and utilization are described in U.S. Pat. No. 2,723,987 to Speier, U.S. Pat. No. 3,450,736 to De Monterey and U.S. Pat. No. 3,859,321 to Traver. Compared to the organopolysiloxanes having SiC-bonded ester groups described in these references, the organopolysiloxanes prepared in accordance with this invention are more resistant to oxidation.

Therefore, it is an object of this invention to provide certain organosiloxane esters. Another object of this invention is to provide certain organosiloxanes having SiC-bonded ester groups. Another object of this invention is to provide organosiloxanes having SiC-bonded groups which are resistant to oxidation. Still another object of this invention is to provide a process for preparing organosiloxanes having SiC-bonded esters. A further object of this invention is to provide novel organosiloxanes having SiC-bonded groups which may be used as textile and metal lubricants. A still further object of this invention is to provide novel organosiloxanes having SiC-bonded groups which may be used as hydraulic fluids.

SUMMARY OF INVENTION

The foregoing objects and others which will become apparent from the following description are accomplished in accordance with this invention, generally speaking, by providing organopolysiloxanes having SiC-bonded ester groups in which the organopolysiloxanes contain at least one unit of the general formula:

$$ROOCCH_2CH(COOR)CH_2CHR'CH_2Si(CH_3)_aO_{3-a/2},$$

where R represents the same or different, monovalent hydrocarbon radicals having 1 to 12 carbon atoms which are free of aliphatic unsaturation and which may contain an ether oxygen atom, R' represents hydrogen or methyl ($CH_3$) radical; a is 0, 1 or 2.

DETAILED DESCRIPTION OF THE INVENTION

In the organosiloxanes having SiC-bonded ester groups, the radicals represented by R are alkyl radicals, such as the methyl, ethyl, n-propyl, isopropyl, n-butyl, sec-butyl, tert-butyl, 4-aminopentyl, 2-ethylhexyl, as well as heptyl and dodecyl radicals; cycloalkyl radicals such as the cyclohexyl radicals; aryl radicals such as the phenyl radical; alkaryl radicals such as the tolyl radicals and aralkyl radicals such as the 3-phenylpropyl radical, and the 2,2-dimethyl-3-phenyl-propyl radical.

When R is a methyl, 2,2-dimethylpentyl or 2,2-dimethyl-3-phenylpropyl radical, then the organosiloxanes prepared in accordance with this invention have a higher viscosity than when the R radical is for example an n-butyl or 2-methoxy-ethylene radical.

It is preferred that the remaining units in the organosiloxanes prepared in accordance with this invention have the general formula $$R''_bSiO_{4-b/2},$$

where R" represents the same or different, monovalent hydrocarbon radicals or halogenated monovalent hydrocarbon radicals having from 1 to 10 carbon atoms which are free of aliphatic unsaturation and b is 0, 1, 2 or 3.

When the hydrocarbon radicals represented by R in the preceding examples have less than 11 carbon atoms, then they also represent examples of hydrocarbon radicals represented by R". Additional examples of hydrocarbon radicals represented by R" are the various isomer decyl radicals.

Examples of halogenated hydrocarbon radicals represented by R" are the 1,1,1-trifluoropropyl radical and o-, m- and p-chlorophenyl radicals.

Because of their availability, it is preferred that at least 50 percent of the R" radicals be methyl radicals.

It is preferred that the organosiloxanes having SiC-bonded ester groups contain from 2 to 300 silicon atoms per molecule. Furthermore it is preferred that on the average a total of 1.8 to 3 SiC-bonded organic radicals be present for each silicon atom, in order to insure that the organosiloxanes of this invention are fluid.

Furthermore this invention relates to a process for preparing organosiloxanes having SiC-bonded ester groups which comprises reacting esters having aliphatic unsaturation in the the presence of a catalyst which promotes the addition of Si-bonded hydrogen to an aliphatic multiple bond in which at least one diester of allylsuccinic acid and/or methallyl succinic acid is used as an ester having aliphatic unsaturation in the acid moiety. The diester may be represented by the general formula:

$$ROOCCH_2CH(COOR)CH_2CR'=CH_2$$

in which R and R' are the same as above.

Diesters of allyl or methallyl succinic acid are well known and may be prepared by a process which comprises reacting alcohols with allyl or methallyl succinic acid anhydride. These acid anhydrides are readily available, for example by reacting propylene or isobutylene with maleic acid anhydride (See Alder et al., Berichte der Deutschen Chemischen Gesellschaft, Vol. 76, 1943, page 44, and Phillips, et al., Journal of the American Chemical Society, Vol. 80, 1958, page 3665).

Any organosiloxane having Si-bonded hydrogen which could have been used heretofore in the addition of Si-bonded hydrogen to organic compounds containing at least one unsaturated bond, may be used in this invention.

Examples of organosiloxanes which may be used in the process of this invention are 1,1,3,3-tetramethyldisiloxanes and organopolysiloxanes having the general formula:

$$R''_3Si(OSiR''_2)_m(OSiHR'')_{298-m}OSiR''_3,$$

in which R" is the same as above and m is zero or an integer having a value of 1 to 297. However, it is also possible to employ cyclic siloxanes, for example those of the formula $(CH_3SiHO)_n$, where n is an integer having a value of 3 to 6; or branched siloxanes, for example those of the general formula $HSi[OSi(CH_3)_3]_3$.

The same catalysts which have been used heretofore to promote the addition of Si-bonded hydrogen to aliphatically unsaturated bonds may be used in this invention to promote the addition of Si-bonded hydrogen to compounds containing at least one aliphatically unsaturated bond. Examples of suitable catalysts which may be employed in this invention, are metals such as platinum, ruthenium, rhodium, palladium, iridium and finely dispersed metals of platinum, ruthenium, rhodium, palladium and iridium. These metals may be applied to carriers such as silicon dioxide, aluminum oxide or activated carbon, and compounds or complexes of these elements may be used, such as for example, $PtCl_4$, $PtCl_6.6H_2O$, $Na_2PtCl_4 \cdot 4H_2O$, platinum-olefin complexes, platinum-alcohol or platinum-alcoholate complexes, platinum-ether complexes, platinum-aldehyde complexes, platinum-ketone complexes, platinum-vinylsiloxane complexes, and platinum-di-vinyltetramethyldisiloxane complexes with or without any detectable halogen; bis-(gamma-picoline)-platinum dichloride, trimethylene dipyridin-platinum dichloride, as well as iron, nickel and cobalt carbonyls.

When metallic platinum, platinum compounds and/or platinum complexes and/or metallic rhodium are used to promote the addition of Si-bonded hydrogen to an aliphatically unsaturated bond, then these catalysts are preferably used in amounts of from 0.001 to 0.02 percent by weight per gram atom of Si-bonded hydrogen.

It is preferred that allyl and/or methallyl succinic acid esters be employed in excess.

The temperatures used in the process of this invention are not critical and may range from about 18° to 180° C., preferably in the range of from 80° to 160° C. and more preferably between 110° and 130° C. The process is generally carried out at atmospheric pressure, but if desired, pressures higher or lower than 1 bar or approximately 1 bar may be used.

Although the process of this invention may be conducted in the absence of solvents, when solvents are employed, they may be the same solvents as have been used heretofore in processes for the addition of Si-bonded hydrogen to compounds containing at least one aliphatically unsaturated bond. Moreover, these solvents should be relatively inert to the reactants and the catalysts used in the reaction. Examples of suitable solvents are alkane mixtures which boil between 80° and 110° C. at 1 bar, benzene, toluene and xylene, halogenated alkanes having from 1 to 6 carbon atoms, such as methylene chloride, trichloroethylene and perchloroethylene; ethers such as di-n-butyl ether; esters such as ethyl acetate and ketones, such as methyl ethyl ketone and cyclohexanone.

When organic solvents are used they are preferably used in an amount of from 50 to 400 percent by weight based on the weight of the organosiloxane having Si-bonded hydrogen.

When an excess of the diesters of allyl succinic acids are reacted with the organosiloxanes containing Si-bonded hydrogen, the excess unreacted ester can be recovered by distillation and after further purification, by for example fractional distillation, it can be used in the reaction with the organosiloxane containing Si-bonded hydrogen.

The organosiloxanes of this invention can also be prepared from the hydrolysis of silanes of the general formula $ROOCCH_2CH(COOR)CH_2CHR'CH_2Si(CH_3)_aX_{3-a}$, where R, R' and a are the same as above, and X represents the same or different hydrolyzable atoms or groups, such as chlorine atoms, methoxy or ethoxy groups. These silanes may also be mixed with other silanes having the general formula:

$R''_bSiX_{4-b}$, where R'', b and X are the same as above. Silanes of the general formula:

$ROOCCH_2CH(COOR)CH_2CHR'CH_2Si(CH_3)_aX_{3-a}$ may be obtained, for example from the addition of at least one diester of the general formula:

$ROOCCH_2CH(COOR)CH_2CR'=CH_2$, where R and R' are the same as above, to at least one silane of the general formula:

$HSi(CH_3)_aX_{3-a}$, where X and a are the same as above, in the presence of a catalyst which promotes the addition of Si-bonded hydrogen to an aliphatic multiple bond. If the ester groups are saponified during this hydrolysis, then the carboxyl groups released can again be esterified.

An example of a suitable diester which may be reacted with a silane such as a trichlorosilane is allyl succinic acid di-n-butyl ester.

The organosiloxanes prepared in accordance with this invention may be used as lubricants for inorganic or organic fibers and as lubricants for metal fabrication and as hydraulic fluids.

Organic fibers that may be treated with the organosiloxanes of this invention are natural fibers, for example, wool, cotton, rayon, hemp or silk, or synthetic fibers, for example, those of polypropylene, polyethylene, polyester, polyurethanes, polyamines, cellulose acetate or polyacrylonitrile, as well as mixtures of two or more of such materials. The fibres are preferably in the form of single threads or yarns or of multiple, mostly treble, twisted threads or yarns. The fibres may, however be in the form of untwisted threads, fleeces, mats, or woven or knitted textiles, including articles of clothing.

The organosiloxanes may be applied to the fibres in any suitable manner known in the art, such as by spraying, immersing, roll coating, or by passing the fibres over a support impregnated with the organosiloxanes.

Through the addition of thickening agents, the organosiloxanes of this invention can be converted into greases. Examples of suitable thickening agents are polytetrafluoroethylene, polyureas, phthalocyanines, clays, silicon dioxides having a BET surface area of at least 50 m²/g and metallic soaps such as lithium stearate, lithium-12-hydroxystearate, aluminum palmitate and calcium stearate.

The organosiloxanes prepared in accordance with this invention can be mixed with other substances which are generally used in the preparation of lubricants, such as pure organic esters, e.g., carboxylic acid esters of trimethylolpropane or pentaerythritol or anti-oxidants.

EXAMPLE 1

In a two-liter, four-necked flask which is equipped with a stirrer, an addition funnel, a reflux condenser and a thermometer, 1025 g of allyl succinic acid di-n-butyl ester are mixed with 0.5 liters of toluene and 40 mg of trimethylene platinum dipyridine-di-chloride and heated to 130° C. After the mixture has been heated, 200 g of a trimethylsiloxy end-blocked methylhydrogenpolysiloxane having on the average 17 methylhydrogensiloxane units per molecule, is added dropwise with constant stirring. During the addition, the temperature is maintained at 130° C. by outside cooling with water. After the addition of the siloxane has been completed, stirring is continued at 120° to 130° C. for sixteen hours. When the mixture is subsequently tested by the addition of alcoholic sodium hydroxide, Si-bonded hydrogen is no longer released.

After distilling off the toluene and excess allyl succinic acid ester at about 16 mbar, about 100 percent yield based on theoretical is obtained in the form of an oil. At $-20°$ C. the oil has a viscosity of 39.4 Pa·s, at 23° C. a viscosity of 1.26 Pa·s and at 140° C. a viscosity of 0.034 Pa·s.

In order to determine the oil's resistance to oxidation, 2 g of the oil are placed in an open, inclined test tube having a diameter of 12 mm which is heated to 150° C. in the presence of air. Gelling can be observed only after more than 1000 hours have elapsed. However, when the specimen has been mixed, prior to heating, with 0.5 percent by weight of dilauryl thiodipropionate, 0.5 percent by weight of 2,6-di-tert-butyl-4-methylphenol and 0.5 percent by weight of 4-hydroxy-3,5-di-tert-butylbenzylphosphonic acid monoethyl ester as anti-oxidants, gelling can be observed only after 5000 hours have elapsed.

The breakdown load of the oil in the 4-ball wear test (1400 rpm, one minute) is 2200/2400 N (breakdown load = transition into the so-called wear position, cf. F. Nordmeyer et al., Erdöl und Kohle-Erdgas-Petrochemie, Vol. 25, 1972, page 200).

The breakdown load for a grease consisting of 2 parts by weight of the oil and 1 part by weight of lithium stearate in the above 4-ball wear test is 1900/2100 N.

EXAMPLE 2

In a one-liter, three-necked flask equipped with a stirrer, a reflux condenser and a thermometer, 0.1 liter of toluene and 128 g of a trimethylsiloxy end-blocked organopolysiloxane having on the average 8 dimethylsiloxane and 8 methylhydrogensiloxane units per molecule, 30 g of allyl succinic acid dimethyl ester and 20 mg of trimethylene platinum dipyridinedichloride are mixed and heated to 115° C. with constant agitation. An additional 160 g of allyl succinic acid dimethyl ester is then added dropwise through the reflux condenser to the heated mixture. After stirring for an additional 12 hours at 120° to 125° C., an additional 30 g of allyl succinic acid dimethyl ester is added and the reactants are heated between 120° and 125° C. for an additional 7 hours. When a sample of the mixture is tested by the addition of alcoholic sodium hydroxide, Si-bonded hydrogen is no longer released.

After distilling off the toluene and excess allyl succinic acid ester, 280 g of an oil is obtained. The oil has a viscosity of 1.02 Pa·s at 23° C. and 0.023 Pa·s at 140° C.

When the oxidation resistance test described in Example 1 is repeated, gelling is observed after approximately 1500 hours in the absence of anti-oxidants.

The breakdown load of the oil in a 4-ball wear test, is 900/1200 N.

EXAMPLE 3

In a 1-liter 3-necked flask equipped with a stirrer, reflux condenser and thermometer, 0.1 liter of toluene, 100 g of a trimethylsiloxy end-blocked organopolysiloxane having on the average 10 dimethylsiloxane and 5 methylhydrogensiloxane units per molecule, 30 g of allyl succinic acid di-(2,2-dimethylpentyl)ester and 20 mg of trimethylene platinum dipyridinedichloride are mixed and heated to 115° C. During agitation, an additional 130 g of the allyl succinic acid ester is added dropwise through the reflux condenser. After an additional 12 hours of stirring at a temperature of from 120° and 125° C., an additional 20 g of the allyl succinic acid ester is added and agitation is continued for another 7 hours at 120° to 125° C.

After distilling off the toluene and excess allyl succinic acid ester, 225 g of an oil are obtained. The oil has a viscosity of 77 Pa·s at $-20°$ C., of 1.38 Pa·s at 23° C. and 0.025 Pa·s at 140° C.

When the oxidation-resistance test described in Example 1 is repeated in the absence of antioxidants, gelling after 500 hours is observed. However, when the sample is mixed prior to heating with 0.5 weight percent of dilauryl thiodipropionate, 0.5 weight percent of pentaerythrityltetrakis-3-(3,5-di-tert-butyl-4-hydroxylphenyl)-propionate and 0.5 weight percent of 4-hydroxy-3,5-di-tert-butyl-benzyl-phosphonic acid monoethyl ester, gelling is observed after over 3000 hours.

EXAMPLE 4

A mixture containing 180 g of allyl succinic acid-di-(2,2-dimethyl-3-phenylpropyl) ester, 50 g of toluene and 20 mg of trimethylene platinum dipyridine-dichloride is heated to about 100° C. To the heated mixture is added dropwise with constant agitation and over a period of 30 minutes, 24 g of 1,1,3,3-tetra-methyldisiloxane, dissolved in 50 ml of toluene. Subsequently the temperature is maintained at 110° to 120° C. for 15 hours. When alcoholic sodium hydroxide is then added to a sample of the mixture, Si-bonded hydrogen is no longer released.

After distilling off the toluene and excess allyl succinic acid ester, 150 g of an oil having a viscosity of 15 Pa.s at 23° C. are obtained.

When the oxidation-resistance test described in Example 1 is conducted in the absence of antioxidants, gelling is observed after 5000 hours have elapsed.

In the 4-ball wear test described in Example 1, the breakdown load of the oil is 800/1000 N.

EXAMPLE 5

A mixture consisting of 200 g of a trimethylsiloxy end-blocked organopolysiloxane having on the average 17 dimethylsiloxane and 17 methylhydrogensiloxane units per molecule, 240 ml of anhydrous di-n-butyl ether, 450 g of allyl succinic acid di-n-butyl ester and 0.5 g of activated carbon coated with 5 weight percent based on the weight of the carbon, of metallic rhodium, are heated for 18 hours at 140° C. under constant agitation. Most of the dibutyl ester is then distilled off at about 16 mbar and the residue is then stirred for an additional 18 hours at 140° C. After the catalyst has been filtered off, the remaining dibutyl ether and the excess allyl succinic acid ester are distilled off at about 1 mbar. The residue represents a yield of about 95 percent of theoretical in the form of an oil which has a viscosity of 3.4 Pa·s at 23° C.

The breakdown load of the oil in the 4-ball wear test referred to in Example 1 is 1200/1400 N.

In the 4-ball wear test described in Example 1, the breakdown load of grease containing 150 parts of the oil and 56 parts of polytetrafluoroethylene is 1800/2000 N.

The polytetrafluoroethylene used in this example is available under the registered trakemark "Hostaflon TF 9205", and has an average molecular weight of from 35,000 to 100,000. The product's average particle size is from 5 to 7 microns.

EXAMPLE 6

A mixture containing 150 g of toluene, 210 g of a trimethylsiloxy end-blocked organopolysiloxane such as described in Example 3, 30 g of allyl succinic acid-di-n-butyl ester and 20 mg trimethylene platinum dipyridine-dichloride is heated to 120° C. Within a period of one hour and under constant agitation 270 g of allyl succinic acid di-n-butyl ester is added to the heated mixture. After stirring has been continued for another 10 hours at 125° to 130° C., an additional 50 g of allyl succinic acid dibutyl ester and 10 mg of the above mentioned platinum compound are added and then heating is continued at 130° to 135° C. for an additional 18 hours.

After distilling off the toluene and excess allyl succinic acid ester, 410 g of oil are obtained. The oil has a viscosity of 2.83 Pa~s at −20° C., 0.335 Pa·s at 23° C. and 0.017 Pa·s at 140° C.

When the oxidation resistance test described in Example 1 is carried out in the absence of antioxidants, gelling is observed after 1500 hours. However, when the antioxidants described in Example 3 are used in the amounts indicated in the Example, gelling is observed after 3800 hours have elapsed.

EXAMPLE 7

A mixture containing 200 g of dimethylpolysiloxane having dimethylhydrogensiloxy terminal units, which has an average of 32 dimethylsiloxane units per molecule, 100 ml of toluene and about 10 mg of trimethyl-platinum dipyridine-dichloride is heated to 115° to 120° C. About 55 g of allyl succinic acid di-n-butyl ester are added dropwise to said heated mixture with constant agitation. After the ester addition has been completed, stirring is continued for an additional 5 hours at 115° to 120° C.

After distilling off the toluene and excess allyl succinic acid ester, essentially a 100 percent yield based on theory is obtained in the form of an oil. After filtering the oil through Fuller's earth, it has a viscosity of 0.222 Pa·s at −20° C., 0.047 Pa·s at 23° C. and 0.015 Pa·s at 80° C.

When the oxidation-resistance test described in Example 1 is performed in the absence of antioxidants, gelling is observed after 2000 hours have elapsed.

In the 4-ball wear test described in Example 1, the breakdown load of the oil is 500/700 N.

EXAMPLE 8

A mixture consisting of 280 g of trimethylsiloxy endblock organopolysiloxane having on the average 15 phenylmethylsiloxane units and 15 methylhydrogensiloxane units per molecule, 500 g of allyl succinic acid di-n-butyl ester and 1 g of activated carbon coated with 1 weight percent based on the weight of carbon of metalic rhodium, is heated for 7 hours to 150° C. with constant stirring and then stirring is continued at the same temperature for an additional 7 hours. Then 0.3 g of the activated carbon rhodium mixture described in Example 5 is added and stirring is continued for an additional 12 hours at 150° C. After the catalyst has been filtered off, excess allyl succinic acid ester is distilled off at about 1 mbar. The yield is about 55 percent of theory and consists of an oily residue which has a viscosity of 740 Pa·s at −20° C., 3.2 Pa·s at 23° C. and of 0.356 Pa·s at 80° C.

When 0.1 weight percent of phenothiazine is added to the oil and the resultant composition is subjected to the oxidation resistance test described in Example 1, gelling is observed after about 400 hours.

The breakdown load of the oil in the 4-ball wear test described in Example 1 is 1400/1500 N.

EXAMPLE 9

A mixture containing 400 g of anhydrous di-n-butyl ether, 405 g of allyl succinic acid di-n-butyl ester and 1 g of activated carbon coated with 1 weight percent based on the weight of the carbon, of metallic rhodium, is heated to 130° C. Within 30 minutes and with constant agitation, 180 g of a trimethylsiloxy end-blocked methylhydrogensiloxane containing on the average 35 methylhydrogensiloxane units per molecule are added to the mixture. After 1 hour has elapsed, 4-methylpentene-1 is added at such a rate that the temperature does not drop below 130° C. After 60 hours the unreacted 4-methylpentene-1 and dibutyl ether are distilled off and fresh 4-methylpentene-1 is added. The total amount of 4-methylpentene-1 added is about 250 g. Stirring is continued at 130° to 140° C. for an additional 30 hours. After the catalyst has been filtered off, low-boiling constituents are distilled from the reaction mixture at a temperature of 170° C. and at 0.5 mbar. An oil is recovered which is 95 percent of theory and has a viscosity of 93 Pa·s at −20° C., 2.5 Pa·s at 23° C. and of 0.34 Pa·s at 80° C.

When antioxidants are omitted, gelling was observed after about 300 hours when the oxidation-resistance test described in Example 1 was performed.

The breakdown load of the oil in the 4-ball wear test described in Example 1 was 1800/1900 N.

EXAMPLE 10

A mixture containing 100 g of toluene, 35 g of a trimethylsiloxy end-blocked methylhydrogenpolysiloxane having 30 methylhydrogensiloxane units per molecule, and about 30 mg of trimethylene platinum dipyridine-dichloride was heated to 110° to 115° C. About 250 g of allyl succinic acid-di-(2-methoxyethyl) ester was added dropwise while stirring to the heated mixture. After the addition of the ester had been completed, stirring was continued at 120° to 130° C. for an additional 36 hours.

After distilling off the toluene and excess allyl succinic acid ester, an oil was recovered in essentially 100 percent yield based on theory.

When the antioxidants described in Example 3 were used in the quantities shown in the Example, the oxidation-resistance test described in Example 1 indicated that gelling occurred only after about 3000 hours.

The breakdown load of the oil in the 4-ball wear test described in Example 1 was over 2000 N.

EXAMPLE 11

The procedure described in Example 10 was repeated, except that the same molar quantity of allyl succinic acid di-n-butyl ester is substituted for the allyl succinic acid di-(2-methoxyethyl) ester.

EXAMPLE 12

The procedure described in Example 10 is repeated, except that the same molar quantity of allyl succinic acid di-methyl ester is substituted for the allyl succinic acid di-(2-methoxyethyl) ester.

COMPARISON EXAMPLE $V_1$

The procedure described in Example 10 is repeated, except that the same molar quantity of undec-10-en-acid-n-butyl ester is substituted for the allyl succinic acid di-(2-methoxyethyl) ester.

COMPARISON EXAMPLE $V_2$

The procedure described in Example 10 is repeated, except that the same molar quantity of allyl acetic acid-n-butyl ester is substituted for the allyl succinic acid di-(2-methoxyethyl) ester.

COMPARISON EXAMPLE $V_3$

The procedure described in Example 10 is repeated, except that the same molar quantity of vinyl acetic acid-n-butyl ester is substituted for the allyl succinic acid di-(2-methoxyethyl) ester.

COMPARISON EXAMPLE $V_4$

The procedure described in Example 10 is repeated, except that the same molar quantity of maleic acid di-n-butyl ester is substituted for the allyl succinic acid di-(2-methoxyethyl) ester.

COMPARISON EXAMPLE $V_5$

The procedure described in Example 10 is repeated, except that the same molar quantity of allyloxy acetic acid-n-butyl ester is substituted for the allyl succinic acid di-(2-methoxyethyl) ester.

The oils obtained in accordance with Examples 11 and 12 as well as with Comparison Examples $V_1$ through $V_5$ were tested for their resistance to oxidation in accordance with the procedure described in Example 1. The following Table shows the results obtained in the presence and absence of the antioxidants cited in Example 3.

TABLE

| Example | Ester | Number of hours after which gelling is observed | |
|---|---|---|---|
| | | Without antioxidants | with antioxidants |
| 11 | Allyl succinic acid-di-n-butyl ester | 200–400 | 600–800 |
| 12 | Allyl succinic acid-di-methyl ester | (*) | over 3500 |

TABLE-continued

| Example | Ester | Number of hours after which gelling is observed | |
|---|---|---|---|
| | | Without antioxidants | with antioxidants |
| $V_1$ | Undecenic acid butyl ester | less than 20 | 100–200 |
| $V_2$ | Allyl acetic acid butyl ester | less than 20 | 50 |
| $V_3$ | Vinyl acetic acid butyl ester | 40–60 | 200–300 |
| $V_4$ | Maleic acid dibutyl ester | 20–50 | less than 100 |
| $V_5$ | Allyloxy acetic acid butyl ester | undetermined | less than 100 |

(*) Not determined, compare with Example 2

EXAMPLE 13

A solution containing 136 g of trichlorosilane in 150 g of toluene is heated to 60° C. About 300 g of allyl succinic acid di-n-butyl ester and 100 mg of $H_2PtCl_6.6H_2O$ which has previously been dissolved in 0.4 ml of cyclohexanone and mixed with the ester are added to the heated solution. The addition is made dropwise and the temperature is allowed to increase to 85° C. Agitation is continued at 94° to 100° C. for an additional 6 hours. The solution containing the trichlorosilylpropylsuccinic acid di-n-butyl ester is then mixed with 117 g of trimethylchlorosilane. About 100 g of water are added dropwise with constant agitation to the silane mixture while the temperature is maintained between about 30° and 40° C. After 3 morehours of agitation, the excess water is distilled off as an azeotrope. The anhydrous solution is then mixed with 3 g of anhydrous, $FeCl_3$ and stirred for 4 hours at between 40° and 50° C., then mixed with 100 g of butanol and heated for 2 hours under reflux while the water generated is removed by means of a Dean-Stark trap. The $FeCl_3$ is then decomposed by the addition of $NaHCO_3$ and stirred for another 2 hours after it has been mixed with 200 ml of water. After distilling off the volatile components at 170° C. at 0.5 mbar, 330 g of an oil having a viscosity of 0.043 Pa·s at 80° C. and 0.012 Pa·s at 140° C. is obtained.

In the 4-ball breakdown test described in Example 1, the breakdown load of the oil is 1700/1900/N.

EXAMPLE 14

A mixture containing 90 g of a trimethylsiloxy endblocked methylhydrogenpolysiloxane having on the average 10 methylhydrogensiloxane units per molecule, and 150 ml of toluene and 20 mg of bis-(gamma-picoline)-platinum dichloride is heated to 110° to 120° C. Over a period of about 30 minutes and under constant agitation, 350 g of allyl succinic acid diethyl ester is added to the heated mixture. When the addition of the ester has been completed, agitation at 135° C. is continued for an additional 8 hours.

After distilling off the excess allyl succinic acid ester, 333 g of an oil having a viscosity of 0.96 Pa·s at 23° C. and 0.081 Pa·s at 80° C. are recovered.

In the 4-ball wear test described in Example 1, the breakdown load of the oil is 1300/1500 N.

The bis-(gamma-picoline)-platinum dichloride used in Example 14 is prepared by the following procedure: About 20 g (48 mMol) of $K_2PtCl_4$ are dissolved in 150 ml of water, then mixed with 7.5 g (96 mMol) of gamma-picoline and then heated to 70° C. while being agitated. A light yellow precipitate is formed, which after cooling is filtered and the filter residue washed with water and dried under a pressure of 1 mbar. About 15 g, i.e. 69 percent by weight based on the weight of K₂PtCl₄, of bis-(gamma-picoline)-platinum dichloride are obtained.

EXAMPLE 15

A mixture containing 140 g of allyl succinic acid anhydride, 150 g of toluene and 0.2 g of H₂PtCl₆.6H₂O is heated to 110° C. Over a period of 3 hours and with constant stirring, a solution containing 150 g of trichlorosilane in 150 g toluene is added to the heated mixture. After stirring for an additional 2 hours at 115° C., the excess trichlorosilane and about 100 g of toluene are removed by distillation. About 140 g of ethanol, containing 6 percent by weight of water based on the total weight of water and ethanol, are added dropwise to the residue. After 4 hours at 40° to 45° C., hydrogen chloride is no longer evolved. The solution obtained is first mixed with 110 g of trimethylchlorosilane and then with 150 g of ethanol and stirred for 3 hours at 50° C.

The mixture obtained is then hydrolyzed by the addition of water and the hydrolyzate is washed until it is free of acid. After distilling the mixture at a temperature of 170° C. and at 0.5 mbar, to remove the volatile components, about 270 g of an oil having a viscosity of 30 Pa·s at −20° C., 0.398 Pa·s at 23° C. and of 0.028 Pa·s at 80° C. is recovered.

EXAMPLE 16

In a 1-liter, 3-necked flask which is equipped with a stirrer, reflux condenser and thermometer, 100 g of di-n-butyl ether and 210 g of a trimethylsiloxy end-blocked organopolysiloxane having on the average 165 dimethylsiloxane and 30 methylhydrogensiloxane units per molecule, are heated to 150° C. About 0.1 g of H₂PtCl₆.6H₂O is dissolved in 1.5 ml of isopropanol and mixed with 160 g of allyl succinic acid di-n-butyl ester. This mixture is then added to the polysiloxane solution through the reflux condenser and stirred for an additional 7 hours at 150° C. At a pressure of about 20 mbar, the solvents and the excess allyl succinic acid di-n-butyl ester are distilled off. Finally, at a pressure of 0.5 mbar, any residual volatile compounds are distilled off at a temperature of 190° C.

Approximately 300 g of an oil having a viscosity of 0.121 Pa·s at 140° C., 2.26 Pa·s at 23° C. and 260 Pa·s at −45° C. are recovered.

In the 4-ball wear test described in Example 1, the breakdown load of the coil is 400/600 N.

What is claimed is:

1. Organosiloxanes having SiC-bonded ester groups which contain at least one unit of the formula $$ROOCCH_2CH(COOR)CH_2CHR'CH_2Si(CH_3)_aO_{3-a/2}$$

in which R is selected from the group consisting of monovalent hydrocarbon radicals having from 1 to 12 carbon atoms which are free of aliphatic unsaturation and monovalent hydrocarbon radicals having one ether oxygen atom, R' is selected from the group consisting of hydrogen and CH₃ radical and a is 0, 1 or 2.

2. The organosiloxanes of claim 1, wherein the remaining units are those of the formula:

$$R''_bSiO_{4-b/2}$$

in which R'' is selected from the group consisting of monovalent hydrocarbon radicals and halogenated monovalent hydrocarbon radicals having from 1 to 10 carbon atoms which are free of aliphatic unsaturation and b is 0, 1, 2 or 3; in which the organosiloxanes contain a total of 2 to 300 silicon atoms per molecule.

3. A process for preparing the organosiloxanes of claim 1 which comprises reacting a diester of the formula $$ROOCCH_2CH(COOR)CH_2CR'=CH_2$$

in which R is selected from the group consisting of monovalent hydrocarbon radicals having from 1 to 12 carbon atoms which are free of aliphatic unsaturation and monovalent hydrocarbon radicals having one ether oxygen atom and R' is selected from the group consisting of hydrogen and CH₃, with an organosiloxane having Si-bonded hydrogen in the presence of a catalyst which promotes the addition of Si-bonded hydrogen to an aliphatic multiple bond.

4. The process of claim 3, wherein the diester is a diester of allyl succinic acid.

5. The process of claim 3, wherein the diester is a diester of methallyl succinic acid.

6. The process of claim 3, wherein the diester is a mixture containing a diester of allyl succinic acid and a diester of methallyl succinic acid.

7. The process of claim 3, wherein the reaction is conducted at a temperature of from 18° to 180° C.

* * * * *

UNITED STATES PATENT AND TRADEMARK OFFICE
CERTIFICATE OF CORRECTION

PATENT NO. : 4,207,246

DATED : June 10, 1980

INVENTOR(S) : Walter Hafner, Erich Markl, Ludwig Eibel, Gerhard Kreis, Dietrich Samrowski, Manfred Wick, Bernward Deubzer and Wilhelm Friedrich It is certified that error appears in the above-identified patent and that said Letters Patent are hereby corrected as shown below:

[30] Foreign Application Priority Data should read

-- March 8, 1978 [DE] Fed. Rep. of Germany 2809874 --.

Signed and Sealed this

Ninth Day of September 1980

[SEAL]

Attest:

SIDNEY A. DIAMOND

Attesting Officer

Commissioner of Patents and Trademarks